(12) United States Patent
Kim (10) Patent No.: US 10,491,007 B2
(45) Date of Patent: Nov. 26, 2019

(54) METHOD AND APPARATUS FOR BATTERY EQUALIZATION, AND BATTERY PACK USING THE SAME

(71) Applicant: Samsung Electronics Co., Ltd., Suwon-si (KR)

(72) Inventor: YoungJae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 15/203,513

(22) Filed: Jul. 6, 2016

(65) Prior Publication Data

US 2017/0141588 A1     May 18, 2017

(30) Foreign Application Priority Data

Nov. 18, 2015 (KR) .................. 10-2015-0161938

(51) Int. Cl.
    *H02J 7/00*     (2006.01)

(52) U.S. Cl.
    CPC .......... *H02J 7/0014* (2013.01); *H02J 7/0018* (2013.01); *H02J 7/0021* (2013.01); *Y02T 10/7055* (2013.01)

(58) Field of Classification Search
    CPC ....... Y02E 60/12; H02J 7/0016; H02J 7/0014; H02J 7/0018; H02J 7/0021; H01M 10/441; H01M 10/425; G01R 31/3658; B60L 11/1861
    USPC ........................................................ 320/112
    See application file for complete search history.

(56) References Cited

U.S. PATENT DOCUMENTS

| 8,766,597 | B2 | 7/2014 | Nork et al. | |
|---|---|---|---|---|
| 2006/0125319 | A1* | 6/2006 | King | B60L 7/06 307/10.1 |
| 2009/0067202 | A1* | 3/2009 | Ichikawa | B60L 15/2045 363/79 |
| 2009/0322283 | A1* | 12/2009 | Zhang | G01R 31/392 320/134 |
| 2010/0244781 | A1 | 9/2010 | Kramer et al. | |
| 2011/0193526 | A1* | 8/2011 | Yang | H01M 10/441 320/118 |
| 2012/0293129 | A1 | 11/2012 | Naghshtabrizi et al. | |

(Continued)

FOREIGN PATENT DOCUMENTS

| EP | 2495802 A2 | 9/2012 |
|---|---|---|
| EP | 2779348 A2 | 9/2014 |

(Continued)

OTHER PUBLICATIONS

Extended European Search Report dated Apr. 10, 2017 in corresponding EP Application No. 16199552.7 (8 pages in English).

*Primary Examiner* — Edward Tso
*Assistant Examiner* — Mohammed J Sharief
(74) *Attorney, Agent, or Firm* — NSIP Law (57) ABSTRACT

A method and an apparatus for charge equalization of batteries, and a battery pack using such a method are provided. A method of charge equalization of batteries involves determining a ratio between first state difference information for each of the batteries and second state difference information calculated based on values of items included in the first state difference information, and defining an output value for each converter corresponding to each of the batteries based on the ratio.

20 Claims, 10 Drawing Sheets

(56) References Cited

U.S. PATENT DOCUMENTS

| | | |
|---|---|---|
| 2014/0125284 A1 | 5/2014 | Qahouq |
| 2014/0159665 A1 | 6/2014 | Boehm et al. |
| 2014/0306668 A1* | 10/2014 | Lee ..................... B60L 11/1838 320/152 |
| 2015/0321576 A1* | 11/2015 | Lee ......................... H02J 7/044 701/22 |
| 2016/0059712 A1* | 3/2016 | Jang ........................ B60L 11/18 307/10.1 |
| 2016/0105039 A1* | 4/2016 | Jeon ..................... H02J 7/0065 320/128 |
| 2016/0118830 A1 | 4/2016 | Jeon et al. |

FOREIGN PATENT DOCUMENTS

| | | |
|---|---|---|
| JP | 5342860 B2 | 11/2013 |
| JP | 2014-60868 A | 4/2014 |
| KR | 10-0970343 B1 | 7/2010 |
| KR | 10-1402802 B1 | 6/2014 |
| KR | 10-1500547 B1 | 3/2015 |

\* cited by examiner

$$P_{Target\_n} = P_{Average} + \alpha * P_{Average} * \varepsilon_n$$

METHOD AND APPARATUS FOR BATTERY EQUALIZATION, AND BATTERY PACK USING THE SAME

CROSS-REFERENCE TO RELATED APPLICATION(S)

This application claims the benefit under 35 USC 119(a) of Korean Patent Application No. 10-2015-0161938, filed on Nov. 18, 2015, in the Korean Intellectual Property Office, the entire disclosure of which is incorporated herein by reference for all purposes.

BACKGROUND

1. Field

The following description relates to a method and an apparatus for battery equalization and a battery pack that mitigates battery charge imbalance.

2. Description of Related Art

When charging and discharging operations are repetitively performed on a plurality of cells included in a battery, chemical differences or aging differences may develop among the plurality of cells. Due to the chemical differences or aging differences, a voltage difference or capacity difference may develop among the cells included in the battery. As a result, one or more cells may become over-charged or over-discharged during charge and discharge cycles. The over-charge and over-discharge that occur among the cells cause a degradation of the battery as well as a reduction in the battery capacity and battery life over time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for charge equalization of batteries involves determining a ratio between first state difference information for each of the batteries and second state difference information calculated based on values of items included in the first state difference information, and defining an output value for each converter corresponding to each of the batteries based on the ratio.

The general aspect of the method may further involve determining a gain based on a degree of imbalance as determined by the second state difference information.

The determining of the gain may involve verifying a range that includes the second state difference information, and determining the gain based on the verified range.

The defining of the output value may involve defining the output value for the each converter based on the ratio, the gain, and an average output physical quantity of a plurality of converters.

The general aspect of the method may further involve transmitting the output value of the converter to a sub-controller corresponding to each of the batteries.

The general aspect of the method may further involve updating state information of the batteries in response to a current or power corresponding to the output value being supplied to a load.

The general aspect of the method may further involve determining state information of each of the batteries based on a physical quantity of each of the batteries and calculating average state information based on the state information, calculating the first state difference information indicating a difference between the state information of each of the batteries and the average state information, and calculating the second state difference information by obtaining a sum of absolute values of the items of the first state difference information.

The general aspect of the method may further involve verifying an outputtable physical quantity of a plurality of converters based on a number of converters, and setting an output physical quantity of the plurality of converters based on the average state information and the verified outputtable physical quantity.

In another general aspect, an apparatus for charge equalization of batteries includes an interface configured to communicate with the batteries, and a processor configured to determine a ratio between first state difference information for each of the batteries and second state difference information calculated based on values of items included in the first state difference information and define an output value for each converter corresponding to each of the batteries based on the ratio.

The processor may be configured to determine a gain corresponding to a degree of imbalance determined by state information of the batteries based on the second state difference information.

The processor may be configured to verify a range including the second state difference information and determine the gain based on the verified range.

The processor may be configured to define the output value of the each converter based on the ratio, the gain, and an average output physical quantity of a plurality of converters.

The interface may be configured to transmit the output value of the converter to a sub-controller corresponding to each of the batteries.

The processor may be configured to update state information of the batteries in response to a current or power corresponding to the output value being supplied to a load.

The processor may be configured to determine state information of each of the batteries based on a physical quantity of each of the batteries and calculating average state information based on the state information, calculate the first state difference information indicating a difference between the state information of each of the batteries and the average state information, and calculate the second state difference information obtaining a sum of absolute values of the items of first state difference information.

The processor may be configured to verify an outputtable physical quantity of converters based on a number of converters, and set an output physical quantity of the converters based on the average state information and the verified outputtable physical quantity.

In another general aspect, a battery pack includes batteries, converters each corresponding to one of the batteries, and a main controller configured to determine a ratio between first state difference information for each of the batteries and second state difference information calculated based on values of items included in the first state difference information and define an output value for each converter corresponding to each of the batteries based on the ratio.

The main controller may be configured to determine a gain corresponding to a degree of imbalance of state information of the batteries based on the second state difference information.

The main controller may be configured to define the output value of the converter based on the ratio, the gain, and an average output physical quantity of the converters.

The main controller may be configured to transmit the output value of the converter to a sub-controller corresponding to each of the batteries, and the sub-controller may be configured to control the converter such that a current or power corresponding to the output value is supplied to a load.

In another general aspect, an apparatus for charge equalization of batteries includes a processor configured to determine first state difference information based on a difference between state information of each of the batteries and average state information, determine second state difference information based on values of items included in the first state difference information, and determine an output value for each converter corresponding to each of the batteries based on a ratio between the first state difference information and the second state difference information.

The determining of the second state difference information may involve calculating a sum of absolute values of the items included in the first state difference information.

The second state difference information may approximate a degree of imbalance among the batteries.

The general aspect of the apparatus may further include an interface circuit for obtaining the state information of each of the batteries.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

Figure 1A:
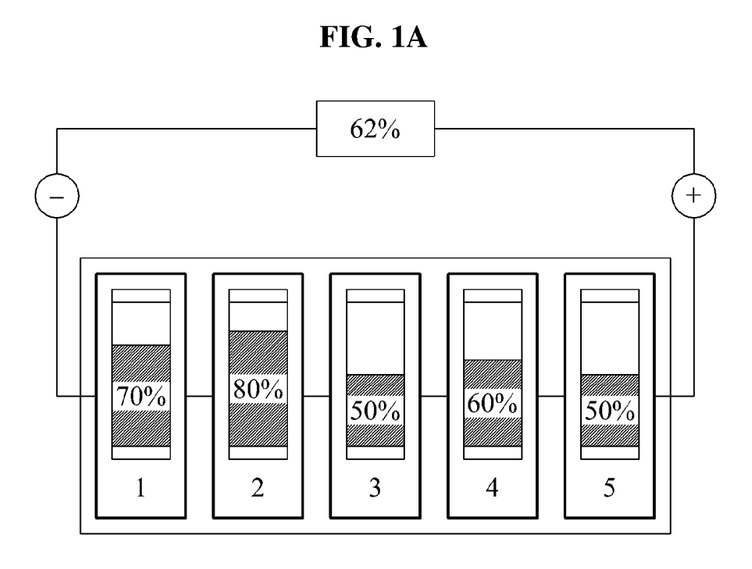
FIGS. 1A through 1C illustrate examples of charge imbalances that may be observed in batteries of a battery pack.
Figure 1B:
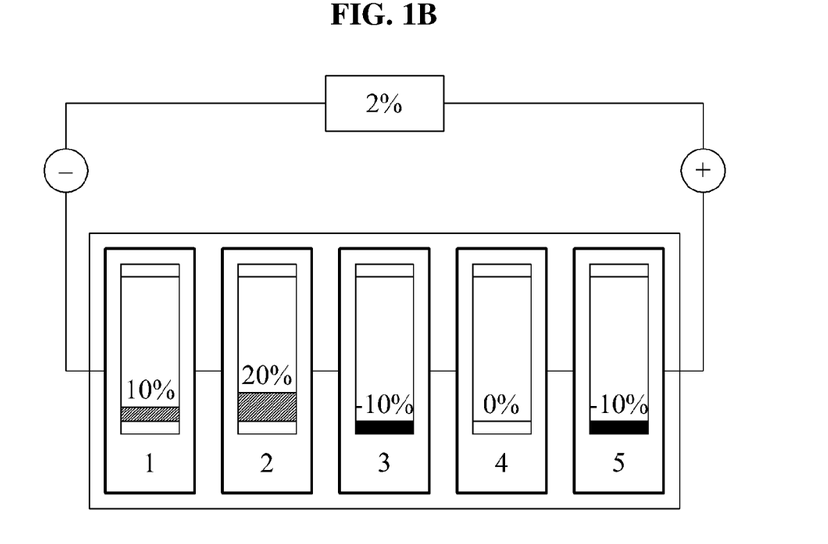
Figure 1C:
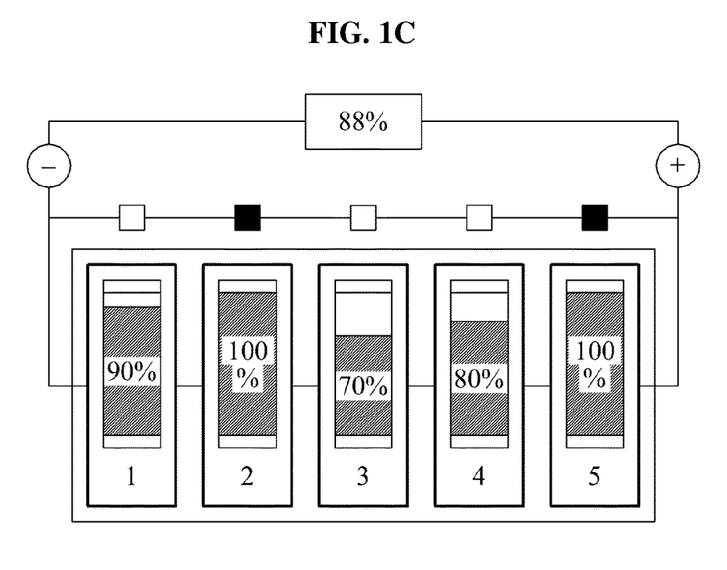

FIGS. 1A through 1C illustrate examples of charge imbalances that may be observed in batteries of a battery pack.

Referring to FIG. 1A, the charge state of a plurality of batteries of a battery pack is unbalanced or un-equalized. A battery pack may include a plurality of battery cells or battery modules. Battery state information includes, for example, at least one of a state of charge (SOC), a capacity, and a state of health (SOH). Each of the plurality of batteries are exposed to a different temperature based on a position of each of the batteries. For this reason, the state information each battery is not the same with the state information of other batteries. Thus, an imbalance exists or the state information is un-equal among the plurality of batteries. In an example of FIG. 1A, SOCs of a battery 1 and a battery 2 are higher than SOCs of a battery 3, a battery 4, and a battery 5.

When the batteries are discharged in a state in which the state information of the plurality of batteries are unequal, a portion of the batteries may be overcharged. Referring to FIG. 1B, the batteries 3 and 5 are discharged more than others. In this example, the batteries 3 and 5 may become deteriorated due to being over-discharged.

Further, when the batteries are charged in a state in which the state information of the batteries are unbalanced, a portion of the batteries may be fully charged while others may be only partially charged. Referring to FIG. 10, the batteries 2 and 5 are fully charged, while the batteries 1, 3, and 4 are only partially charged in a charged-state of the battery pack. Because some batteries are only partially charged, the overall utilization rate of the batteries is reduced.

In the event that a charging and discharging cycle of the plurality of batteries is iterated in a state in which the state information of the plurality of batteries is unbalanced, a degradation in life performance may radically occur, and energy utilization of the batteries may be decreased.

Figure 2:
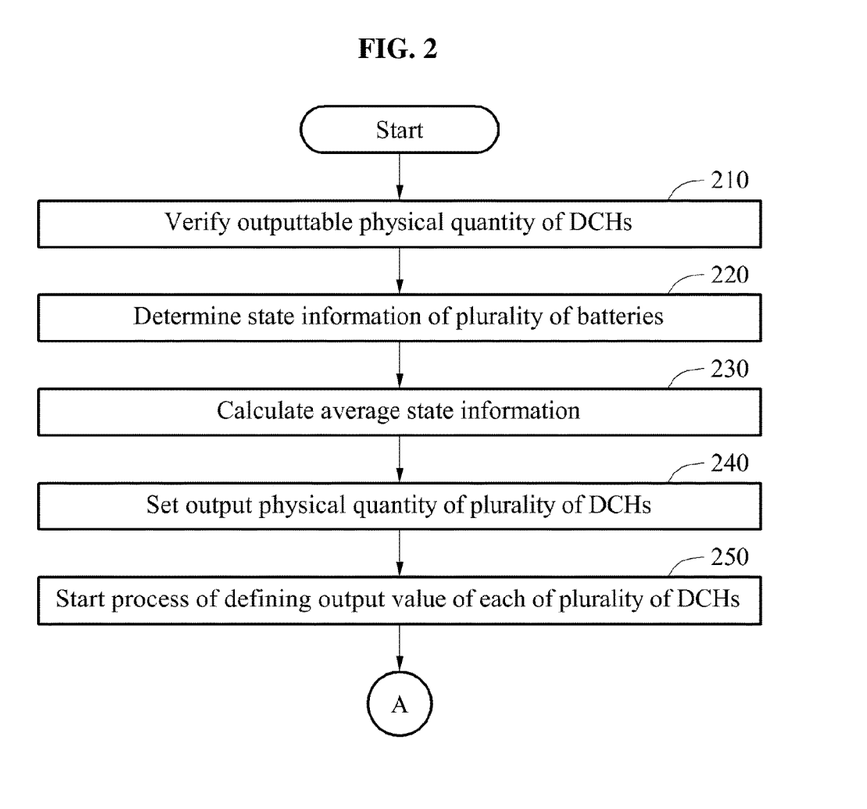
FIGS. 2 and 3 illustrate examples of methods for battery equalization.
Figure 3:
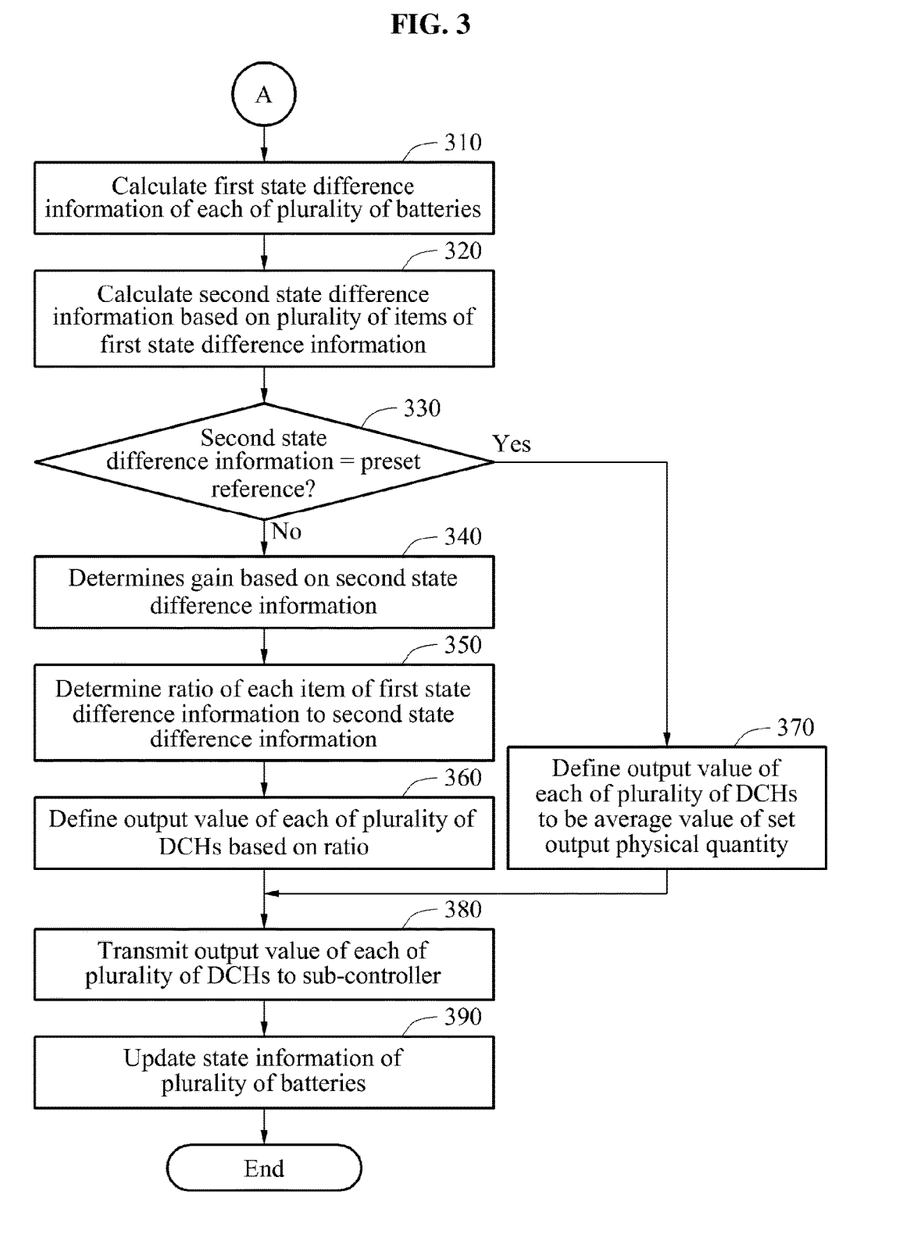

FIGS. 2 and 3 illustrate examples of a method of battery equalization.

The method of battery equalization is performed by a battery equalization apparatus.

Referring to FIG. 2, in operation 210, the battery equalization apparatus verifies an outputtable physical quantity of a plurality of differential charge handlers (DCHs). The DCH includes, for example, a direct current (DC)-to-DC (DC/DC) converter. The battery equalization apparatus verifies a number of DCHs and verifies the outputtable physical quantity of the plurality of DCHs based on the verified number of DCHs. For example, the battery equalization apparatus may verify that there are ten DCHs and verify that the ten DCHs are capable of outputting 10 watts (W). The physical quantity includes, for example, at least one of power and a current.

In operation 220, the battery equalization apparatus determines state information of a plurality of batteries. The battery equalization apparatus receives a physical quantity of each of the plurality of batteries from a sub-controller corresponding to each of the plurality of batteries. The physical quantity of each of the plurality of batteries includes at least one of, for example, a voltage, a current, a temperature, and an impedance. The battery equalization apparatus determines state information of each of the plurality of batteries based on the physical quantity of each of the plurality of batteries. Also, the battery equalization apparatus determines a value obtained by multiplying an SOC by an SOH for each battery of the plurality of batteries to be the state information of each battery. For example, the battery equalization apparatus determines a value obtained by multiplying an SOC by an SOH of a first battery to be state information of the first battery. Similarly, the battery equalization apparatus determines a value obtained by multiplying an SOC by an SOH of a second battery to be state information of the second battery.

Hereinafter, an example in which the battery state information is an SOC will be described. However, the battery state information according to the present description is not limited to be an SOC only. Thus, the following descriptions are also applicable to examples in which the battery information corresponds to, for example, a value obtained by multiplying the SOC by an SOH and a capacity.

In operation 230, the battery equalization apparatus calculates average state information of the plurality of batteries. The plurality of batteries may belong to a battery pack. The battery equalization apparatus calculates $SOC_{Average}$ using the SOC of each of the plurality of batteries as shown in Equation 1.

$$SOC_{Average} = (SOC_1 + SOC_2 + \ldots + SOC_N)/N \quad \text{[Equation 1]}$$

In Equation 1, N denotes the number of batteries. For example, N may correspond to the total number of batteries in the battery pack.

In operation 240, the battery equalization apparatus sets the outputtable physical quantity of the plurality of DCHs. The physical quantity set by the apparatus may correspond to a sum of physical quantities output by the DCHs. A physical quantity output by each of the DCHs is defined through a process in operation 250. The battery equalization apparatus sets an output physical quantity, for example, $P_{DCH}$ or $I_{DCH}$ based on the average state information and the outputtable physical quantity of the plurality of DCHs. The battery equalization apparatus sets the outputtable physical quantity verified in operation 210 to be the output physical quantity based on the average state information. For example, when the outputtable physical quantity is verified as 10 W and the average state information exceeds or corresponds to a preset reference, $P_{DCH}$ may be set to be 10 W. The preset reference may, for example, correspond to a half of a maximum SOC of the plurality of batteries. Also, an outputtable current is set to be $I_{DCH}$.

In operation 250, the battery equalization apparatus starts a process of defining an output value of each of the plurality of DCHs. Through the process, the physical quantity output by each of the DCHs is defined. Hereinafter, the process of defining the output value of each of the plurality of DCHs will be described with reference to FIG. 3.

Referring to FIG. 3, in operation 310, the battery equalization apparatus calculates first state difference information of each of a plurality of batteries. The first state difference information indicates, for example, a difference value between state information of each of the plurality of batteries and average state information. In this example, the first state difference information of each of the plurality of batteries may be expressed as shown in Equation 2.

$$\Delta SOC_n = SOC_n - SOC_{Average} \quad \text{[Equation 2]}$$

In operation 320, the battery equalization apparatus calculates second state difference information based on a plurality of items of first state difference information. The second state difference information may correspond to, for example, a sum of absolute values of the plurality of items of first state difference information. In this example, the second state difference information may be expressed as shown in Equation 3.

$$\Sigma |\Delta SOC_n| = |\Delta SOC_1| + |\Delta SOC_2| + \ldots + |\Delta SOC_N| \quad \text{[Equation 3]}$$

The more unbalanced the state information of the plurality of batteries, the greater $|\Delta SOC_n|$. The more approximate the state information of the plurality of batteries to a balance state, the less $|\Delta SOC_n|$. That is, the second state difference information indicates a degree of imbalance among the batteries. Thus, in one example, the second state difference information is used as a reference for determining a balance state of the plurality of batteries.

The battery equalization apparatus determines an average output physical quantity of the plurality of DCHs. The average output physical quantity indicates, for example, an average value of physical quantities supplied by the plurality of DCHs to a low-voltage load. As an example, the battery equalization apparatus determines the average output physical quantity based on Equation 4.

$$P_{Average} = P_{DCH}/N \text{ or } I_{Average} = I_{DCH}/N$$

$$P_{Average} = P_{LDC}/N \text{ or } I_{Average} = I_{LDC}/N \quad \text{[Equation 4]}$$

The battery equalization apparatus determines an average value of a set output physical quantity, for example, $P_{DCH}$ or $I_{DCH}$ to be the average output physical quantity. Also, the battery equalization apparatus acquires information on a use current, $I_{LDC}$ or a use current, $P_{LDC}$ of the low-voltage load, and determines an average value of $P_{LDC}$ or $I_{LDC}$ to be the average output physical quantity.

In operation 330, the battery equalization apparatus verifies whether or not the second state difference information satisfies a preset reference. The battery equalization apparatus defines the output value of each of the plurality of DCHs based on each of a response to the second state difference information satisfying the preset reference and a response to the second state difference information dissatisfying the preset reference. According to one example, when the second state difference information is 0 or substantially equal to 0, the battery equalization apparatus determines that the preset reference is satisfied. When the second state difference information is greater than 0, the battery equalization apparatus determines that the preset reference is not satisfied. However, this method of determining whether or not the preset reference is satisfied is provided as an example only; thus, a method of determining whether or not a preset reference is satisfied is not limited to this example. Hereinafter, an example of an operation of defining an output value in response to the second state difference information satisfying the preset reference will be described.

In response to determining that the second state difference information satisfies the preset reference, the battery equalization apparatus defines the output value of each of the plurality of DCHs to be an average output physical quantity in operation 370. For example, $P_{Target\_n}=P_{Average}$ or $I_{Target\_n}=I_{Average}$, $P_{Target\_n}$ and $I_{Target\_n}$ being the output value of each of the plurality of DCHs.

The second state difference information satisfying the preset reference indicates that state information of a plurality of batteries is balanced. Thus, the output values of the plurality of DCHs may not be defined to differ from one another. Hereinafter, an operation of defining an output value in response to the second state difference information dissatisfying the preset reference will be described as an example.

In response to a determination that the second state difference information does not satisfy the preset reference, the battery equalization apparatus determines a gain, for example, a based on the second state difference information in operation 340. The battery equalization apparatus verifies a range including the second state difference information and determines the gain based on the verified range. As an example, the battery equalization apparatus verifies the range including the second state difference information among ranges represented in Equation 5.

$$0<\Sigma|\Delta SOC_n|\leq 1$$

$$1<\Sigma|\Delta SOC_n|<10$$

$$10\leq\Sigma|\Delta SOC_n| \qquad \text{[Equation 5]}$$

A gain corresponding to each of the ranges is set in advance. In this example, a gain corresponding to a first range is 0.5, and a gain corresponding to a second range is a desired constant ranging between 1 and 5. In addition, a gain corresponding to a third range is a desired constant ranging between 6 and 10. The gain corresponding to the second range and the gain corresponding to the third range may be predetermined values. In the event that the second state difference information is included in the first range, the battery equalization apparatus may determine the gain to be 0.5. In the event that the second state difference information is included in the second range, the battery equalization apparatus may determine the gain to be, for example, 3. In the event that the second state difference information is included in the third range, the battery equalization apparatus may determine the gain to be, for example, 6.

When the state information of the plurality of batteries is unbalanced, the gain is set to a relatively large value. When the state information of the plurality of batteries is approximately balanced, the gain is set to a relatively small value. Thus, the gain corresponds to a degree of imbalance indicating a degree to which state information of each of the plurality of batteries is unbalanced.

The descriptions of the gain and the range are provided as an example. Thus, the gain and the range are not limited to this example.

The battery equalization apparatus determines a ratio between the second state difference information and a plurality of items of first state difference information. In operation 350, the battery equalization apparatus determines a ratio of each item of the first state difference information to the second state difference information. In this example, the battery equalization apparatus may determine the ratio based on Equation 6.

$$\varepsilon_n=\Delta SOC_n/(\Sigma|\Delta SOC_n|) \qquad \text{[Equation 6]}$$

In this example, when $SOC_n$ is greater than $SOC_{Average}$, $\Delta SOC_n$ is a positive value and $\varepsilon_n$ is a positive value. When $SOC_n$ is less than $SOC_{Average}$, $\Delta SOC_n$ is a negative value and $\varepsilon_n$ is a negative value. $\varepsilon_n$ is a positive value or a negative value. $\varepsilon_n$ being a positive value indicates that a battery supplies a relatively large amount of power or current to a load. $\varepsilon_n$ being a negative value indicates that the battery supplies a relatively small amount of power or current to the load.

In operation 360, the battery equalization apparatus defines the output value of each of the plurality of DCHs based on the ratio. The battery equalization apparatus defines the output value of each of the plurality of DCHs based on the gain, the ratio, and the average output physical quantity of the plurality of DCHs. As an example, the battery equalization apparatus defines the output value of each of the plurality of DCHs based on Equation 7.

$$P_{Target\_n}=P_{Average}+\alpha*P_{Average}*\varepsilon_n \text{ or}$$
$$I_{Target\_n}=I_{Average}+\alpha*I_{Average}*\varepsilon_n \qquad \text{[Equation 7]}$$

The battery equalization apparatus defines the output value of each of the plurality of DCHs by adding or subtracting an average output physical quantity corresponding to a preset value. In this example, the preset value is a value to which the ratio and the gain are applied. In Equation 7, $\alpha*P_{Average}*\varepsilon_n$ or $\alpha*I_{Average}*\varepsilon_n$ is the preset value. As the foregoing, the descriptions related to the output value definition scheme corresponding to a case in which the second state difference information dissatisfies the preset reference value are provided as an example.

In operation 380, the battery equalization apparatus transmits the output value of each of the plurality of DCHs to a sub-controller corresponding to each of the plurality of batteries. The sub-controller controls each of the plurality of DCHs based on the output value. Through this, the power or current corresponding to the output value is supplied to the low-voltage load.

When the state information of the plurality of batteries is unbalanced, the plurality of batteries output current or power having different values to the low-voltage load. For example, a battery in which a large amount of power is stored supplies a relatively large amount of power of current to the low-voltage load, and a battery in which a small amount of power is stored supplies a relatively small amount of power of current to the low-voltage load. Through this, the state information of the plurality of batteries approximates to a balanced state or is maintained as balanced. Also, despite an increase in a charging and discharging count of the plurality of batteries, a decrement in energy utilization is reduced and a degradation rate of the plurality of batteries does not increase.

In the event that the power or current corresponding to the output value is supplied to the low-voltage load, the battery equalization apparatus updates the state information of the plurality of batteries in operation 390. The sub-controller transmits information on a physical quantity output by each of the plurality of DCHs to the battery equalization apparatus. The battery equalization apparatus acquires the information on the physical quantity output by each of the plurality of DCHs, and updates the state information of the plurality of batteries based on the acquired information.

The battery equalization apparatus may repetitively perform operations 310 through 390 for a preset period of time. After the preset period of time, the battery equalization apparatus performs an operation, starting from operation 210 of FIG. 2.

Figure 4:
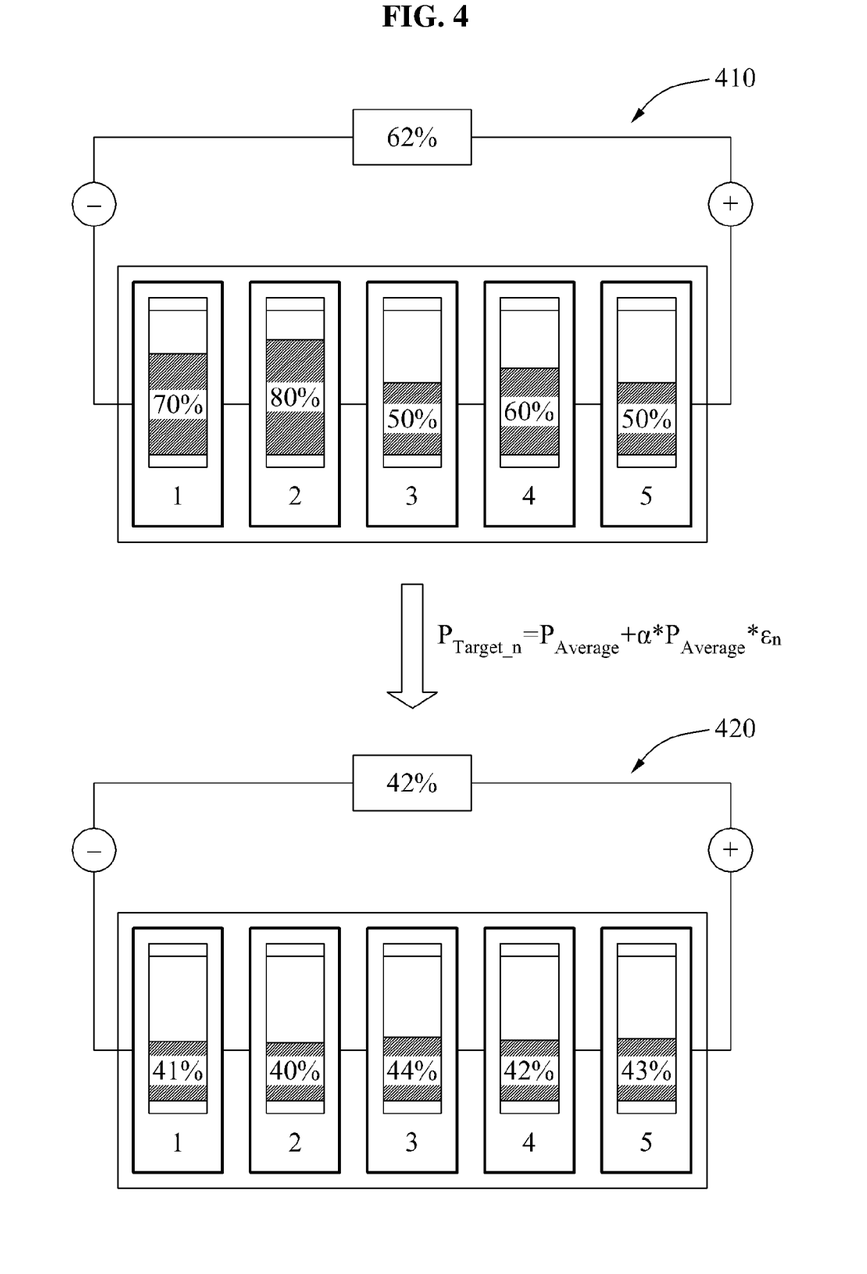
FIG. 4 illustrates an example of an operation of an apparatus for battery equalization.

FIG. 4 illustrates an example of an operation of a battery equalization apparatus that controls charge equalization of batteries in a battery pack.

In an upper part of FIG. 4, state information of a plurality of batteries 410 is unbalanced. In this example, an SOC of a battery 1 is 7, an SOC of a battery 2 is 8, an SOC of a battery 3 is 5, an SOC of a battery 4 is 6, and an SOC of a battery 5 is 5. The battery equalization apparatus defines a different output value for a DCH corresponding to each of a plurality of batteries.

The battery equalization apparatus calculates $SOC_{Average}$. In FIG. 4, $SOC_{Average}=(7+8+5+6+5)/5=6.2$. Also, the battery equalization apparatus sets an output physical quantity of a plurality of batteries. For example, if an output physical quantity $P_{DCH}$ is 10 W, an average output physical quantity $P_{Average}=2$.

The battery equalization apparatus calculates $\Delta SOC_n$. In FIG. 4, $\Delta SOC_1=0.8$, $\Delta SOC_2=1.8$, $\Delta SOC_3=-1.2$, $\Delta SOC_4=-0.2$, and $\Delta SOC_5=-1.2$. The battery equalization apparatus calculates $\Sigma|\Delta SOC_n|$. In FIG. 4, $\Sigma|\Delta SOC_n|=5.2$.

The battery equalization apparatus determines a gain based on $\Sigma|\Delta SOC_n|$. As shown in Equation 5, $\Sigma|\Delta SOC_n|$ is to be greater than 1 after the calculating, the battery equalization apparatus determined the gain to be 3.

The battery equalization apparatus determines a ratio between $\Delta SOC_n$ and $\Sigma|\Delta SOC_n|$. In FIG. 4, the battery equalization apparatus determines that, for example, $\varepsilon_1=0.8/5.2$, $\varepsilon_2=1.8/5.2$, $\varepsilon_3=-1.2/5.2$, $\varepsilon_4=-0.2/5.2$, and $\varepsilon_5=-1.2/5.2$.

The battery equalization apparatus defines an output value of a DCH corresponding to each of the plurality of batteries. In FIG. 4, the battery equalization apparatus defines the output value as follows:

$$P_{Target\_1}=2+3*2*0.8/5.2\approx 3\ W;$$

$$P_{Target\_2}=2+3*21.8/5.2\approx 4\ W;$$

$$P_{Target\_3}=2+3*2*(-1.2/5.2)\approx 0.6\ W;$$

$$P_{Target\_4}=2+3*2*(-0.2/5.2)\approx 1.8\ W;\ \text{and}$$

$$P_{Target\_5}=2+3*2*(-1.2/5.2)\approx 0.6\ W.$$

Here, $P_{Target\_1}$ and $P_{Target\_2}$ are greater than $P_{Average}$, and $P_{Target\_3}$, $P_{Target\_4}$, and $P_{Target\_5}$ are less than $P_{Average}$. The battery equalization apparatus adjusts $P_{Average}$ and defines an output value of a DCH corresponding to each of a battery 1 and a battery 2. In this example, the battery equalization apparatus defines the output value to be greater than $P_{Average}$ based on the ratio. Also, the battery equalization apparatus adjusts $P_{Average}$ and defines an output value of a DCH corresponding to each of a battery 3, a battery 4, and a battery 5. In this example, the battery equalization apparatus defines the output value to be less than $P_{Average}$ based on the ratio.

As an example, the battery equalization apparatus defines $P_{Target\_1}$ through $P_{Target\_5}$ based on information as shown in Table 1.

TABLE 1

|  | SOC | $SOC_{Average}$ | $\Delta SOC_n$ | $\Sigma|\Delta SOC_n|$ | $\varepsilon_n$ | $P_{Target\_n}$ |
|---|---|---|---|---|---|---|
| Battery 1 | 7 | 6.2 | 0.8 | 5.2 | 0.8/5.2 | 3 |
| Battery 2 | 8 |  | 1.8 |  | 1.8/5.2 | 4 |
| Battery 3 | 5 |  | −1.2 |  | −1.2/5.2 | 0.6 |
| Battery 4 | 6 |  | −0.2 |  | −0.2/5.2 | 1.8 |
| Battery 5 | 5 |  | −1.2 |  | −1.2/5.2 | 0.6 |

A sum of $P_{Target\_1}$ through $P_{Target\_5}$ is 10 W, and $P_{DCH}$ is 10 W. Even though $P_{Target\_1}$ through $P_{Target\_5}$ are defined to differ from one another, the sum of $P_{Target\_1}$ through $P_{Target\_5}$ is the same as $P_{DCH}$, for example, $P_{DCH}=P_{Target\_n}$. The battery equalization apparatus defines output values of a plurality of DCHs to differ from one another while maintaining a sum of the output values as the same. Through this, a constant current or constant power is supplied from the plurality of DCHs to a low-voltage load.

The battery equalization apparatus transmit each of $P_{Target\_1}$ through $P_{Target\_5}$ to a sub-controller corresponding to each of the plurality of batteries. Power corresponding to each of $P_{Target\_1}$ through $P_{Target\_5}$ is supplied to the low-voltage load. Each of the battery 1 and the battery 2 supplies a relatively large amount of power to the low voltage load, and each of the battery 3, the battery 4, and the battery 5 supplies a relatively small amount of power to the low voltage load. Through this, the state information of the batteries 1 through 5 approximates to a balance.

In a lower part of FIG. 4, state information of a plurality of batteries 420 is balanced. The battery equalization apparatus operates to equalize charges and/or the state information of the plurality of batteries 420. When the charges and/or the state information of the plurality of batteries 420 are un-equalized due to external and internal influences, the battery equalization apparatus defines a different output value for each DCH to equalize the charges and/or the state information of the plurality of batteries 420. Through this, an energy utilization of the plurality of batteries 420 increases and the plurality of batteries 420 is to be used efficiently.

Figure 5:
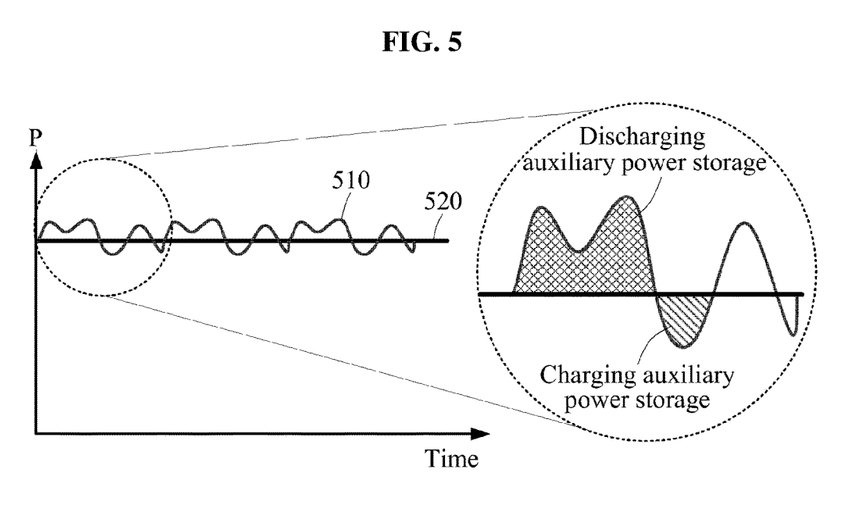
FIG. 5 illustrates an example of a power supply.

FIG. 5 illustrates an example of a power supply.

FIG. 5 illustrates a sum 520 of output values of each of a plurality of DCHs and a user power 510, $P_{LDC}$ of a low-voltage load over time. $P_{LDC}$ varies overtime, and the sum 520 is maintained as the same.

The low voltage load includes a system operating at a low voltage, for example, 12 volts (V) such as a posture control system and a temperature control system in an electric moving body.

The plurality of DCHs outputs power to satisfy $P_{LDC}$. The power indicates, for example, a sum of $P_{Target\_n}$. When $P_{LDC}$ of the low voltage load exceeds the sum 520, an auxiliary power storage, for example, a $12V_{DC}$ auxiliary battery, and the plurality of DCHs supply power to the low voltage load. When $P_{LDC}$ is less than the sum 520, a reserve power is used to charge the auxiliary power storage.

Figure 6:
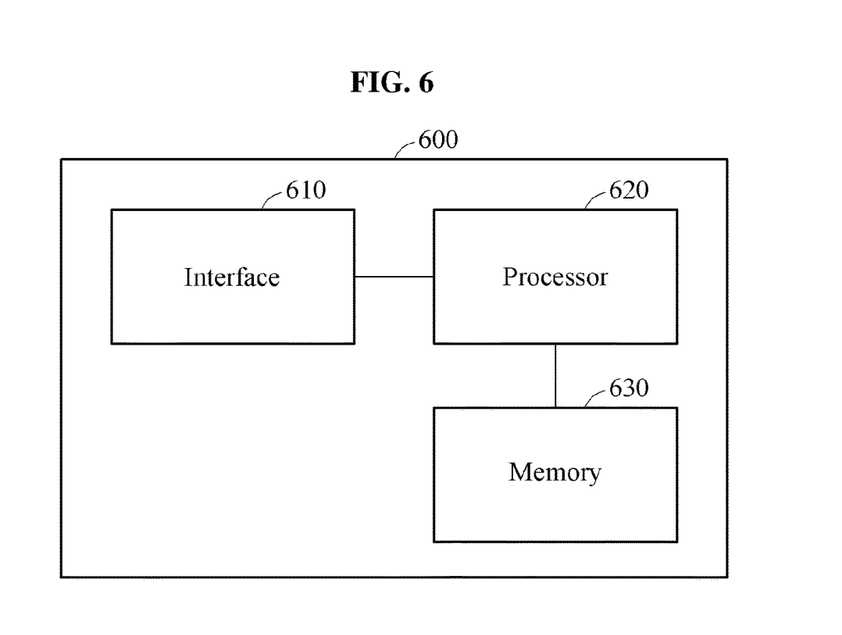
FIG. 6 illustrates an example of an apparatus for battery equalization.

FIG. 6 illustrates a battery equalization apparatus 600.

Referring to FIG. 6, the battery equalization apparatus 600 includes an interface 610, a processor 620 and a memory 630. The interface 610 may include an interface circuit. The processor 620 may retrieve and store values in the memory 630.

The interface 610 communicates with a plurality of batteries. The interface 610 communicates with a sub-controller corresponding to each of the plurality of batteries. The interface 610 communicates with the sub-controller based on, for example, a controller area network (CAN) based communication method, a one-wire based communication method, and a two-wire based communication method. The aforementioned communication methods are provided as an example and thus, a communication method is not limited to the example.

The processor 620 determines a ratio between first state difference information of each of the plurality of batteries and second state difference information.

The processor 620 defines an output value of a converter corresponding to each of the plurality of batteries based on the ratio. The converter corresponds to, for example, a DCH.

The descriptions related to FIGS. 1 through 5 are also applicable to here and thus, repeated descriptions of FIG. 6 will be omitted.

Figure 7:
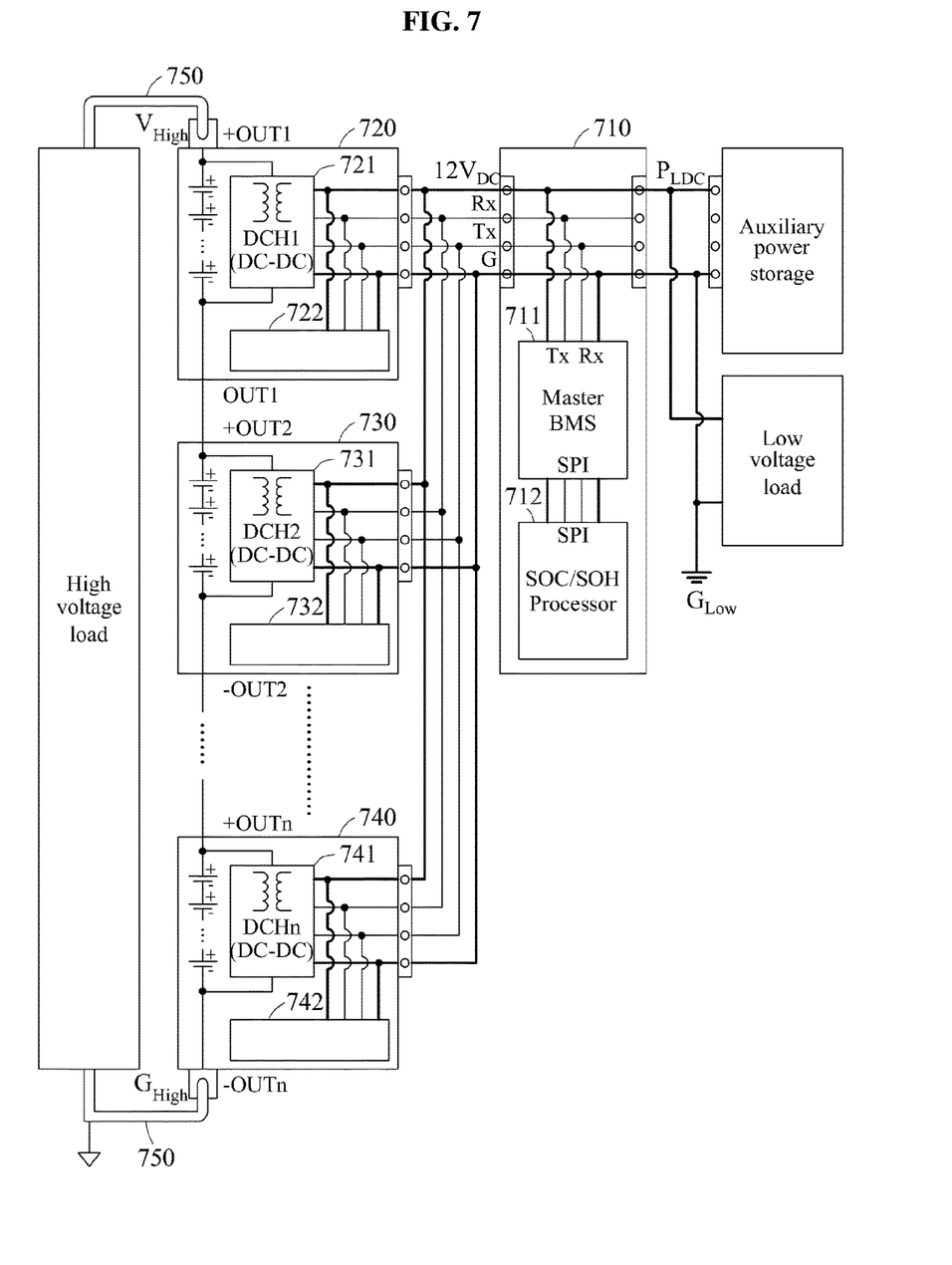
FIG. 7 illustrates an example of a battery pack.

FIG. 7 illustrates an example of a battery pack.

Referring to FIG. 7, the battery pack includes a main controller 710 and a plurality of batteries, for example, batteries 720, 730, and 740. The main controller 710 corresponds to the battery equalization apparatus described above.

The main controller 710 includes a master battery management system (BMS) 711 and an SOC/SOH processor 712. The SOC/SOH processor 712 determines state information of the batteries 720, 730, and 740. The master BMS 711 performs operations of the battery equalization apparatus other than an operation performed by the SOC/SOH processor 712. As an example, the master BMS 711 defines output values of a plurality of DCHs, for example, DCHs 721, 731, and 741 and transmits the defined output values to a plurality of sub-controllers, for example, sub-controllers 722, 732, and 742.

In an example, in lieu of the master BMS 711, each of the sub-controllers 722, 732, and 742 determines a ratio and define the output value of each of the DCHs 721, 731, and 741. In this example, the master BMS 711 determines a gain and transmits the determined gain to each of the sub-controllers 722, 732, and 742.

Referring to the example illustrated in FIG. 7, the SOC/SOH processor 712 and the master BMS 711 are devices physically separated from each other. Alternatively, based on an implementation, the SOC/SOH processor 712 and the master BMS 711 are logically separated in a single physical device.

Each of the batteries 720, 730, and 740 includes a sub-controller and a DCH. The sub-controllers 722, 732, and 742 control a voltage, a current, a temperature, and/or an impedance of the batteries 720, 730, and 740, respectively.

The batteries 720, 730, and 740 are connected in series. The batteries 720, 730, and 740 are connected through OUT terminals, and supplies power stored in each of the batteries 720, 730, and 740 through a line 750 to a high-voltage load. The line 750 through which the power is supplied to the high-voltage load differs from a line used to supply power to a low-voltage load and/or an auxiliary power storage. Each of the batteries 720, 730, and 740 does not convert the power to supply the power to the high-voltage load.

The DCHs 721, 731, and 741 are connected in parallel. Through this, a sum of $P_{target\_1}$ through $P_{target\_n}$ is supplied to the low-voltage load and/or the auxiliary power storage.

Each of the DCHs 721, 731, and 741 converts or steps down high-voltage power stored in at least one battery cell included in each of the batteries 720, 730, and 740 into low-voltage power, and supplies the low-voltage power to the low-voltage load and/or the auxiliary power storage.

Figure 8:
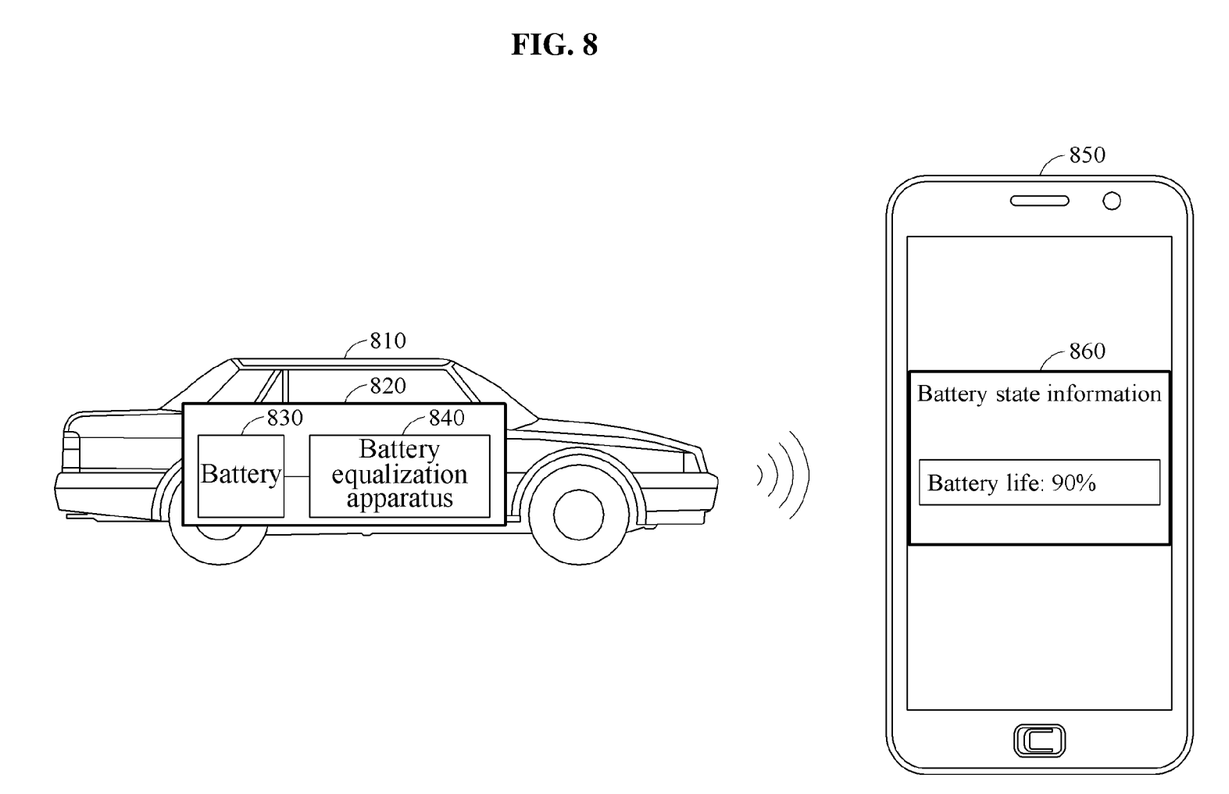
FIG. 8 illustrates an example of a user interface to provide battery state information.

FIG. 8 illustrates an example of a user interface that may be used to provide battery state information to a user.

Referring to FIG. 8, a physical object, for example, an electric moving body 810 includes a battery system 820. In this example, the electric moving body 810 is a vehicle. The electric moving body 810 is provided as an example of a physical application; thus, a type of physical application is not limited to the example. A battery system is applicable to an electric moving body and any type of physical application using a battery.

The battery system 820 includes battery 830 and a battery equalization apparatus 840. In this example, the battery system 820 may be implemented by a battery pack as described above.

The battery 830 includes one or more battery modules or battery cells. The battery modules or battery cells may correspond to a plurality of batteries of a battery pack as described above.

When a charging/discharging cycle of a battery pack having a performance deviation, for example, a voltage difference and/or a capacity difference among the plurality of battery cells is iterated, an over-charging and over-discharging may occur in individual battery cells. The over-charging and over-discharging may cause a degradation in the plurality of battery cells, thereby reducing lives of the battery cells.

The battery equalization apparatus 840 enables the plurality of battery cells to operate in an optimal state based on information including, for example, a voltage, a current, and a temperature of the plurality of battery cells. As an example, the battery equalization apparatus 840 enables the plurality of battery cells to operate at an optimal temperature or maintains state information of the plurality of battery cells to correspond to an appropriate level. Also, the battery equalization apparatus 840 defines a different output value for each DCH corresponding to each of the plurality of battery cells so as to equalize the state information of the plurality of battery cells.

The battery equalization apparatus 840 generates information for a safe operation of the battery system 820 and transmits the information to a terminal. For example, the battery equalization apparatus 840 transmits life information, performance information, and/or a replacement time of the plurality of battery cells to a terminal 850.

In an example, the battery equalization apparatus 840 receives a trigger signal from the terminal 850 through a wireless interface, and determines state information, for example, life information of the battery 830 based on the trigger signal. The battery equalization apparatus 840 transmits the state information to the terminal 850 through the wireless interface. The terminal 850 displays the state information of the plurality of battery cells using a user interface 860. In this example, the terminal 850 is a mobile terminal such as a smart phone, and battery state information is displayed on a display screen of the smart phone.

According to one example, a battery equalization apparatus is implemented in, for example, a form of chip. Additionally, the battery equalization apparatus is included in a high-capacity battery management system such as an energy storage system (ESS), an electric vehicle, and a hybrid vehicle, for example. Also, the battery equalization apparatus is included in a device management system or an electronic device including a rechargeable battery.

Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for charge equalization of batteries, the method comprising:
   determining a first state difference information for each of the batteries indicating a difference between a state information of the each of the batteries and an average state information of the batteries;
   determining a second state difference information based on a sum of absolute values of the first state difference information of the each of the batteries;
   determining a ratio between the first state difference information for the each of the batteries and the second state difference information;
   defining an output value for each converter corresponding to the each of the batteries based on the ratio; and
   controlling an output of the each of the batteries based on the corresponding converter.

2. The method of claim 1, further comprising:
  determining a gain based on a degree of imbalance as determined by the second state difference information.

3. The method of claim 2, wherein the determining of the gain comprises:
  verifying a range that includes the second state difference information; and
  determining the gain based on the verified range.

4. The method of claim 2, wherein the defining of the output value comprises defining the output value for the each converter based on the ratio, the gain, and an average output physical quantity of the converters for the respective batteries.

5. The method of claim 1, further comprising:
  transmitting the output value of the converter to a sub-controller corresponding to the each of the batteries.

6. The method of claim 1, further comprising:
  updating state information of the batteries in response to a current or power corresponding to the output value being supplied to a load.

7. The method of claim 1, wherein the determining of the second state difference information comprises:
  determining the second state difference information by obtaining the sum of absolute values of the first state difference information.

8. The method of claim 7, further comprising:
  verifying an outputtable physical quantity of the converters for the respective batteries based on a number of converters; and
  setting an output physical quantity of the converters based on the average state information and the verified outputtable physical quantity.

9. An apparatus for charge equalization of batteries, the apparatus comprising:
  an interface configured to communicate with the batteries; and
  a processor configured to
    determine a first state difference information for each of the batteries indicating a difference between a state information of the each of the batteries and an average state information of the batteries;
    determine a second difference information based on a sum of absolute values of the first state difference information of the each of the batteries;
    determine a ratio between the first state difference information for the each of the batteries and the second state difference information,
    define an output value for each converter corresponding to the each of the batteries based on the ratio, and
    control an output of the each of the batteries based on the corresponding converter.

10. The apparatus of claim 9, wherein the processor is further configured to determine a gain corresponding to a degree of imbalance determined by state information of the batteries based on the second state difference information.

11. The apparatus of claim 10, wherein the processor is further configured to verify a range including the second state difference information and determine the gain based on the verified range.

12. The apparatus of claim 10, wherein the processor is further configured to define the output value of the each converter based on the ratio, the gain, and an average output physical quantity of the converters for the respective batteries.

13. The apparatus of claim 9, wherein the interface is further configured to transmit the output value of the converter to a sub-controller corresponding to the each of the batteries.

14. The apparatus of claim 9, wherein the processor is further configured to update the state information of the batteries in response to a current or power corresponding to the output value being supplied to a load.

15. The apparatus of claim 9, wherein the processor is further configured to determine the second state difference information by obtaining a sum of absolute values of the first state difference information.

16. The apparatus of claim 15, wherein the processor is further configured to verify an outputtable physical quantity of converters based on a number of converters, and to set an output physical quantity of the converters based on the average state information and the verified outputtable physical quantity.

17. A battery pack comprising:
  batteries;
  converters corresponding to the respective batteries; and
  a controller configured to
    determine a first state difference information for each of the batteries indicating a difference between a state information of the each of the batteries and an average state information of the batteries,
    determine a second state difference information based on a sum of absolute values of the first state difference information of the each of the batteries,
    determine a ratio between the first state difference information for the each of the batteries and the second state difference information,
    define an output value for each converter of the converters based on the ratio, and
    control an output of the each of the batteries based on the corresponding converters.

18. The battery pack of claim 17, wherein the controller is further configured to determine a gain corresponding to a degree of imbalance of state information of the batteries based on the second state difference information.

19. The battery pack of claim 18, wherein the controller is further configured to define the output value of the converter based on the ratio, the gain, and an average output physical quantity of the converters.

20. The battery pack of claim 17, wherein the controller is further configured to transmit the output value of the converter to a sub-controller corresponding to the each of the batteries, and
  the sub-controller is configured to control the converter such that a current or power corresponding to the output value is supplied to a load.

* * * * *